United States Patent Office 3,099,655
Patented July 30, 1963

3,099,655
$\Delta^{3,5}$-PREGNADIENE DERIVATIVES
John A. Zderic, Palo Alto, Calif., and Otto Halpern and Jose Iriarte, Mexico City, Mexico, assignors, by mesne assignments, to Syntex Corporation, a corporation of Panama
No Drawing. Filed Nov. 17, 1961, Ser. No. 153,237
Claims priority, application Mexico July 14, 1961
20 Claims. (Cl. 260—239.55)

The present invention relates to novel cyclopentanophenanthrene derivatives and to a process for the production thereof.

More particularly the present invention refers to 21-fluoro, 21-hydroxy and/or 17α-hydroxy derivatives of $\Delta^{3,5}$-pregnadien-20-one and to the esters thereof.

This invention also relates to the corresponding derivatives substituted at the C-16 by a radical such as α or β-methyl, α-hydroxy or α-acyloxy and the 16,17-cyclic acetals and ketals of 16α,17α-dihydroxy-$\Delta^{3,5}$-pregnadiene.

The novel compounds of the present invention are powerful progestational agents with anti-estrogenic and anti-androgenic activity, possess anti-ovulatory activity and inhibit the secretion of gonadotrophin by the pituitary gland, are represented by the following formula:

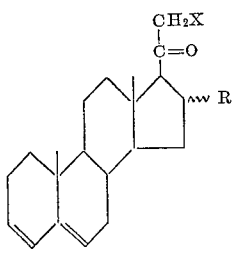
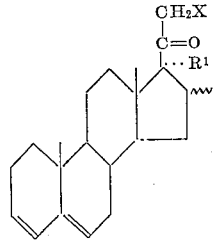

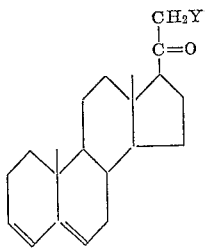

In the above formulas X represents hydrogen, fluorine, hydroxy, or hydrocarbon carboxylic acyloxy of less than 12 carbon atoms; Y represents fluorine, hydroxy or hydrocarbon carboxylic acyloxy of less than 12 carbon atoms; R represents α-methyl, β-methyl, α-hydroxy or α-hydrocarbon carboxylic acyloxy of less than 12 carbon atoms; $R^1$ represents hydroxy or hydrocarbon carboxylic acyloxy of less than 12 carbon atoms; $R^2$ represents hydrogen, α-methyl, β-methyl, α-hydroxy or α-hydrocarbon carboxylic acyloxy of less than 12 carbon atoms and $R^1$ and $R^2$ together may represent the grouping

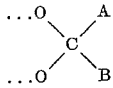

wherein A represents hydrogen, a lower alkyl, an aryl or aralkyl group of up to eight carbon atoms and B represents a lower alkyl, an aryl or aralkyl group of up to eight carbon atoms. Each of A and B may also represent a carbon atoms. A and B together with the intermediate carbon atom may represent a carbocyclic or heterocyclic radical.

The acyl groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The novel $\Delta^{3,5}$-pregnadien-20-one and the 16-substituted derivatives thereof of the present invention are prepared by the method illustrated by the following series of reactions:

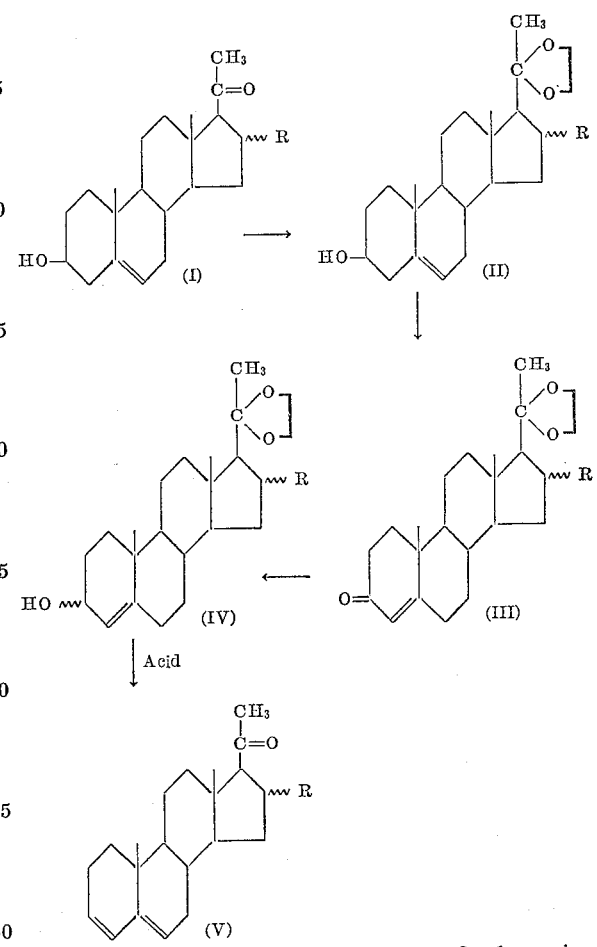

In the above formulas R has the above defined meaning.

In practicing the process just outlined, the starting compound, which may be 16α-methyl-$\Delta^5$-pregnen-3β-ol-20-one, 16β-methyl-$\Delta^5$-pregnen-3β-ol-20-one or $\Delta^5$-pregnene-3β,16α-diol-20-one (I) is converted into the corresponding ketal (II) by treatment with ethylene glycol in benzene solution and in the presence of p-toluenesulfonic acid. Oxidation of this compound by the Oppenauer method gives the respective $\Delta^4$-3-ketone (III). Upon reduction of this α,β-unsaturated ketone with a double metal hydride, preferably with lithium aluminum hydride in ether or tetrahydrofuran or with sodium borohydride in methanol there is obtained a mixture of the respective 3α and 3β-hydroxy compounds (IV) predominating the 3β-isomer.

On heating the foregoing mixture of compounds with aqueous acetic acid, preferably with 50% acetic acid, at a temperature between 75 and 100° C., for a period of time of 1 to 4 hours, there is effected a dehydration, with simultaneous hydrolysis of the ethylene-dioxy group, thus affording 16α-methyl-$\Delta^{3,5}$-pregnadien-20-one, 16β-methyl-$\Delta^{3,5}$-pregnadien-20-one and $\Delta^{3,5}$-pregnadien-16α-ol-20-one (V).

In the same manner, from 21-fluoro-Δ⁵-pregnen-3β-ol-20-one or the 16-substituted derivatives thereof, there are obtained correspondingly 21-fluoro - Δ³,⁵ - pregnadien-20-one, 21-fluoro - 16α - methyl-Δ³,⁵-pregnadien-20-one, 21-fluoro-16β-methyl-Δ³,⁵-pregnadien-20-one and 21-fluoro-Δ³,⁵-pregnadien-16α-ol-20-one.

The novel 3-desoxy-Δ³,⁵-pregnadien-17α-ol, the 16-substituted derivatives thereof and the corresponding esters are prepared by the process illustrated by the following equation:

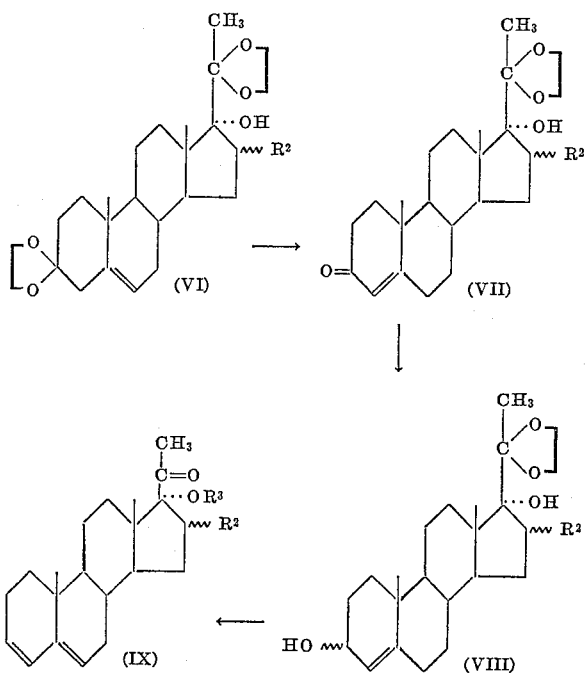

In the above formulas R³ represents hydrogen or an acyl group derived from a hydrocarbon carboxylic acid of up to 12 carbon atoms; R² has the same meaning as previously indicated.

In practicing the process outlined above the starting compound, which is the 3,20-bisethylene ketal of 17α-hydroxyprogesterone, or a 16-substituted derivative thereof (VI) is selectively hydrolyzed at C-3 under mild acid conditions, preferably by treatment with perchloric acid in tetrahydrofuran solution, thus affording the 20-mono ketal of 17α-hydroxyprogesterone or the corresponding 16-substituted derivative (VII). Upon reduction of the keto group at C-3 with a double metal hydride, there is formed a mixture of 3α and 3β hydroxy compounds (VIII). Upon reaction of the thus obtained 3-hydroxy-Δ⁴-compound (VIII) with 50% acetic acid there is afforded dehydration and a simultaneous hydrolysis of the ketal at C-20 as disclosed hereinbefore for the compounds not substituted at C-17α, and there are obtained Δ³,⁵-pregnadien-17α-ol-20-one, 16α-methyl-Δ³,⁵-pregnadien-17α-ol-20-one, 16β-methyl-Δ³,⁵-pregnadien-17α-ol-20-one, and Δ³,⁵-pregnadien-16α,17α-diol-20-one (IX, R³=H).

These compounds may be esterified conventionally with anhydrides or chlorides of hydrocarbon carboxylic acids of from 1 to 12 carbon atoms, in benzene solution in the presence of p-toluenesulfonic acid (IX, R³=acyl). In the case of Δ³,⁵-pregnadien-16α,17α-diol-20-one there are obtained the diesters.

Upon treatment of Δ³,⁵-pregnadien-16α,17α-diol-20-one with a ketone or an aldehyde, such as methyl ethyl ketone, acetone, formaldehyde, cyclohexanone, benzophenone, acetaldehyde, furfuraldehyde or benzaldehyde in the presence of an acid catalyst, such as perchloric acid, there are obtained the corresponding cyclic 16α,17α-ketals or acetals.

The 17α,21-dihydroxy or diacyloxy compounds of the present invention are prepared by the process illustrated by the following series of reactions:

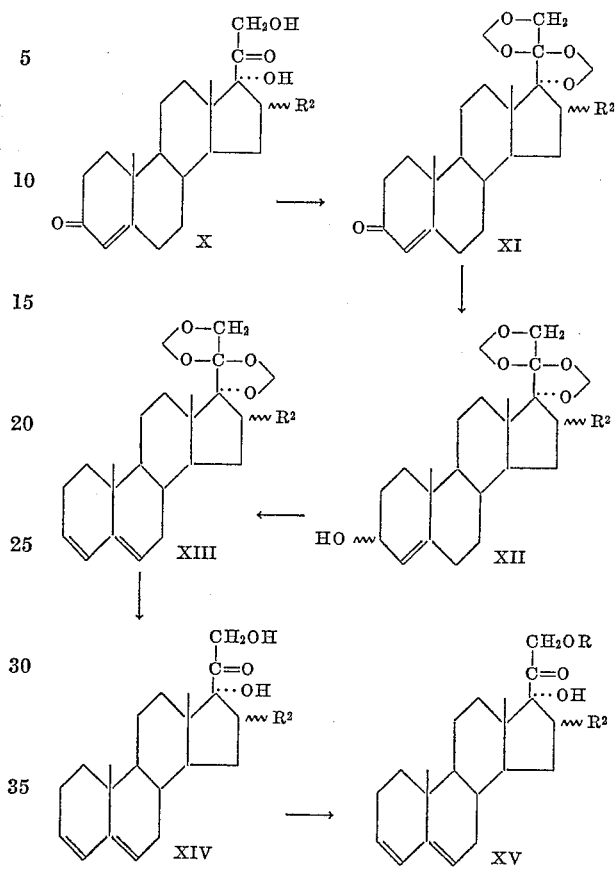

In the above formulas R is a hydrocarbon carboxylic acyl group of up to 12 carbon atoms and R² represents hydrogen, α or β-methyl, α-hydroxy or α-acyloxy of the type described previously.

In practicing the process outlined above the starting compound which is Δ⁴-pregnen-17α,21-diol-3,20-dione or a 16-substituted derivative thereof (X), is converted into the corresponding bismethylenedioxy derivative (XI) by treatment with formaldehyde in an acid medium, as for example, in the presence of hydrochloric acid. On reduction of this compound with a double metal hydride, preferably with lithium aluminum hydride in ether or tetrahydrofuran, or sodium borohydride in methanol, there is obtained a mixture of 17,20;20,21-bismethylenedioxy-Δ⁴-pregnen-3β-ol and 17,20;20,21-bismethylenedioxy-Δ⁴-pregnen-3α-ol or of the corresponding 16-substituted derivatives (XII) which are dehydrated with 50% acetic acid, thus affording the 17,20;20,21-bismethylenedioxy-Δ³,⁵-pregnadiene or the corresponding 16-substituted derivative (XIII).

The side chain is regenerated by treating the foregoing compound with a strong acid, preferably by heating with 60% formic acid thus affording Δ³,⁵-pregnadien-17α,21-diol-20-one, 16α-methyl - Δ³,⁵ - pregnadien-17α,21-diol-20-one, 16β-methyl - Δ³,⁵ - pregnadien-17α,21-diol-20-one and Δ³,⁵-pregnadien-16α,17α-21-triol-20-one (XIV).

By conventional esterification of the foregoing compounds with anhydrides or chlorides of hydrocarbon carboxylic acids in pyridine, there are obtained the corresponding 21-monoesters (XV). In the case of Δ³,⁵-pregnadien-16α,17α,21-triol-20-one there are obtained the 16α-21-diesters.

When reacting Δ³,⁵-pregnadien-16α-17α,21-triol-20-one (XV, R²=α-hydroxy) with an aldehyde or a ketone, such as described above in the presence of an acid catalyst preferably perchloric acid, there are obtained the corresponding cyclic 16α,17α-ketals or acetals.

The 17α-tertiary hydroxyl is esterified by reation with an anhydride or chloride of a hydrocarbon carboxylic acid of the previously mentioned type, in benzene and in the presence of p-toluenesulfonic acid.

The 21-fluoro-Δ³,⁵-pregnadiene derivatives of the present invention are obtained by the method illustrated by the following series of reactions:

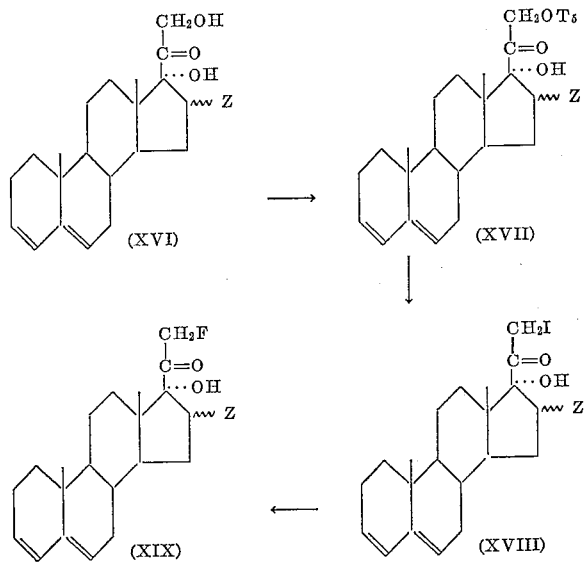

In the above formulas Z represents hydrogen or α or β methyl.

In practicing the process just outlined, the starting Δ³,⁵-pregnadien-17α,21-diol-20-one or the 16α or 16β methyl derivative thereof (XVI) is treated with an aryl sulfonic acid chloride, preferably p-toluenesulfonic acid chloride in pyridine to give the corresponding 21-tosylate (XVII). Alternatively there may be employed other sulfonic acid halides, such as benzen-sulfonyl chloride or methane sulfonyl bromide. Reflux of the above tosylate with sodium iodide in acetone solution for a period of time comprised between 30 minutes and 6 hours, preferably 1 hour, affords the corresponding 21-iodo compound (XVIII), which on treatment with a metal fluoride, preferably silver fluoride produces the respective 21-fluoro-derivative (XIX). The reaction is effected preferably in solution of a nitrile derived from a lower hydrocarbon carboxylic acid such as acetonitrile or butyronitrile or in a tertiary alcohol such as ter-butanol or ter-amylol. The reaction takes place at room temperature during 20 to 30 hours or at a temperature between 35° and 60° C. for a period of time between 6 and 8 hours.

In order to obtain the cyclic 16,17-ketals or acetals of 21-fluoro-Δ³,⁵-pregnadien-16α,17α-diol, necessary to treat the Δ³,⁵-pregnadien-16α,17α-21-triol-20-one with an aldehyde or ketone in the presence of perchloric acid before the above described reactions are effectuated.

Upon hydrolysis of the thus produced 16,17-acetals or 16,17-ketals of 21-fluoro-Δ³,⁵-pregnadien-20-one with formic acid, there are obtained the corresponding 16-17-diols which may be esterified with hydrocarbon carboxylic acid anhydrides or chlorides as described above to afford the 16-mono esters or 16,17-diesters.

The following specific examples serve to illustrate but are not intended to limit the scope of the present invention:

*Example I*

A mixture of 5 g. of 17α-hydroxyprogesterone, 125 cc. of thiophene-free benzene, 25 cc. of ethylene glycol and 250 mg. of p-toluenesulfonic acid was refluxed for 8 hours, using a water separator. It was cooled and the resulting solution was washed with 10% sodium bicarbonate and with water to neutral, dried over anhydrous sodium sulfate and evaporated to dryness under reduced pressure. By crystallization from acetone-hexane there was obtained 3,20-bisethylenedioxy-Δ⁵-pregnen-17α-ol. A mixture of 2 g. of the latter compound, 20 cc. of tetrahydrofuran and 16 cc. of 3 N perchloric acid was left for 3 hours at room temperature. It was neutralized with sodium carbonate solution, water was added until complete precipitation, the product was filtered off and dried. By crystallization from acetone-ether there was obtained the 20-ethylenedioxy-Δ⁴-pregnen-17α-ol-3-one, which showed a melting point of 234–236° C., λ max. 242 mμ; log=4.14.

A solution of 1 g. of the foregoing compound in 50 cc. of tetrahydrofuran was added cautiously to a suspension of 500 mg. of lithium aluminum hydride in 50 cc. of tetrahydrofuran. The mixture was refluxed for 1 hour under anhydrous conditions, then cooled and cautiously treated with ethyl acetate. There was then added a saturated sodium sulfate solution, and then solid sodium sulfate, the inorganic material filtered off and washed with hot ethyl acetate. The filtrate was evaporated to dryness in vacuo, there was thus obtained a mixture of 20-ethylenedioxy-Δ⁴-pregnen-3β,17α-diol and the 3α-isomer thereof.

The foregoing crude product was dissolved in 25 cc. of 50% acetic acid and the resulting solution heated on a steam bath for 4 hours. Thereafter it was diluted with water, the formed precipitate was filtered off, washed to neutral and recrystallized from acetone-ether. There was thus obtained Δ³,⁵-pregnadien-17α-ol-20-one.

*Example II*

Following the series of reactions described in the foregoing example, 16α-methyl-17α-hydroxy-progesterone and 16β-methyl-17α-hydroxy-progesterone were converted respectively into 16α-methyl-Δ³,⁵-pregnadien-17α-ol-20-one and 16β-methyl-Δ³,⁵-pregnadien-17α-ol-20-one.

*Example III*

A mixture of 10 g. of Δ⁵-pregnen-3β-ol-20-one, 150 cc. of thiophene-free benzene, 25 cc. of ethylene glycol and 250 mg. of p-toluenesulfonic acid was refluxed for 8 hours, using a water separator. It was cooled and the resulting solution was washed with 10% sodium bicarbonate, with water to neutral, dried over anhydrous sodium sulfate and evaporated to dryness under reduced pressure. On crystallization from acetone-hexane there was obtained 20-ethylenedioxy-Δ⁵-pregnen-3β-ol.

There were distilled 10 cc. of a solution of 2 g. of the foregoing compound in 100 cc. of toluene and 10 cc. of cyclohexanone in order to eliminate moisture by azetropic distillation. A solution of 1 g. of aluminum isopropoxide in 10 cc. of toluene was added and the mixture refluxed for 1 hour under anhydrous conditions. 5 cc. of acetic acid were added and the solvents were eliminated by steam distillation, the product was extracted with ethyl acetate, and the organic extract washed with water to neutral, dried over anhydrous sodium sulfate and evaporated to dryness. On crystallization from acetone-hexane there was obtained 20-ethylenedioxy-Δ⁴-pregnen-3-one.

A solution of 1 g. of the above compound in 50 cc. of anhydrous tetrahydrofuran was cautiously added to a suspension of 500 mg. of lithium aluminum hydride in 50 cc. of tetrahydrofuran. The resulting mixture was refluxed for 1 hour under anhydrous conditions, then it was cooled and the excess reagent was decomposed by cautious addition of ethyl acetate. There was then added a saturated solution of sodium sulfate and thereafter solid sodium sulfate, the mixture was filtered and the solid washed with hot ethyl acetate. The filtrate was evaporated to dryness under vacuum. There was thus obtained a mixture of 20-ethylene-dioxy-Δ⁴-pregnen-3β-ol and the 3α-isomer thereof.

The foregoing crude product was dissolved in 25 cc. of 50% acetic acid and the resulting solution heated on a steam bath for 4 hours. After this period of time it was diluted with water, the formed precipitate filtered off, washed to neutral and recrystallized from acetone-ether. There was thus obtained the $\Delta^{3,5}$-pregnadien-20-one.

*Example IV*

The foregoing example was repeated, but using as starting materials 16α-methyl-$\Delta^5$-pregnen-3β-ol-20-one and 16β-methyl-$\Delta^5$-pregnen-3β-ol-20-one, thus being obtained as final products 16α-methyl-$\Delta^{3,5}$-pregnadien-20-one and 16β-methyl-$\Delta^{3,5}$-pregnadien-20-one.

*Example V*

5 g. of 21-fluoro-$\Delta^5$-pregnen-3β-ol-20-one, were submitted to the series of reactions described in Example III, thus affording successively: 21-fluoro-20-ethylenedioxy - $\Delta^5$ - pregnen - 3β - ol, 21 - fluoro - 20 - ethylenedioxy - $\Delta^4$ - pregnen - 3β - one, 21 - fluoro - 20 - ethylenedioxy-$\Delta^4$-pregnen-3β-ol and the 3α-isomer thereof and 21-fluoro-$\Delta^{3,5}$-pregnadien-20-one.

In the same manner 16α-methyl-21-fluoro-$\Delta^5$-pregnen-3β-ol-20-one described by V. Petrono et al., J. Chem. Soc. 3595 (1959), gave as final product, 16α-methyl-21-fluoro-$\Delta^{3,5}$-pregnadien-20-one.

*Example VI*

To a solution of 10 g. of $\Delta^5$-pregnen-3β,16α,17α-triol-20-one in 100 cc. of acetone were added 5 cc. of 72% perchloric acid and the mixture was stirred at room temperature for 1 hour. It was then diluted with water and extracted with methylene chloride. The organic extract was washed with sodium bicarbonate solution and water to neutral, dried over anhydrous sodium sulfate and evaporated to dryness under vacuum. On crystallization from acetone-ether there was obtained the 16,17-acetonide of $\Delta^5$-pregnene-3β,16α,17α-triol-20-one.

Following the series of reactions described in Example III, the foregoing compound was converted into 16α,17α-isopropylidendioxy-$\Delta^{3,5}$-pregnadien-20-one.

*Example VII*

A mixture of 1 g. of $\Delta^5$-pregnen-3β,16α,17α-triol-20-one, 50 cc. of freshly distilled benzaldehyde and 0.5 cc. of 72% perchloric acid was stirred at room temperature for 1 hour. The resulting solution was washed with sodium bicarbonate solution and with water to neutral, dried over anhydrous sodium sulfate and evaporated to dryness in vacuo. On crystallization from acetone-methanol there was obtained the 16α,17α-benzyl acetal of $\Delta^5$-pregnen-3β,16α,17α-triol-20-one.

Following the method described in Example III, the foregoing compound was converted into the 16,17-benzyl acetal of $\Delta^{3,5}$-pregnadien-16α,17α-diol-20-one.

*Example VIII*

To a solution of 5 g. of the 3-acetate of $\Delta^5$-pregnen-3β,16α-diol-20-one in 150 cc. of methanol was added a solution of 2 g. of potassium hydroxide in 5 cc. of water and 25 cc. of methanol and the mixture was refluxed for 1 hour. It was then neutralized with acetic acid, concentrated to a small volume under vacuum and poured into water. The formed precipitate was filtered off and dried to give 4.2 g. of $\Delta^5$-pregnen-3β,16α-diol-20-one.

In accordance with the series of reactions described in Example III, the foregoing compound was successively converted into 20-ethylenedioxy-$\Delta^5$-pregnen-3β,16α-diol, 20-ethylenedioxy-$\Delta^4$-pregnen-16α-ol-3-one, 20-ethylenedioxy-$\Delta^4$-pregnen-3β,16α-diol and the 3α-isomer thereof and $\Delta^{3,5}$-pregnadien-16α-ol-20-one.

A mixture of 1 g. of the foregoing compound, 5 cc. of pyridine and 2 cc. of acetic anhydride was heated on a steam bath for 1 hour, then poured into water and the formed precipitate filtered off. Crystallization from acetone-hexane afforded the acetate of $\Delta^{3,5}$-pregnadien-16α-ol-20-one.

*Example IX*

To a mixture of 5 g. of $\Delta^4$-pregnen-17α,21-diol-3,20-dione and 40 cc. of a 37% formaldehyde solution were added 0.5 cc. of concentrated hydrochloric acid and the mixture was let stand at room temperature for 48 hours. It was then poured into water, the formed precipitate was filtered off and dried, thus yielding 17,20;20,21-bismethylenedioxy-$\Delta^4$-pregnen-3-one.

The foregoing compound was dissolved in 100 cc. of methanol and treated with a solution of 2 g. of sodium borohydride in 5 cc. of water and the mixture was left at room temperature overnight. The excess reagent was decomposed with acetic acid, the solution was concentrated to a small volume under reduced pressure and diluted with water. The product was extracted with ethyl acetate and the organic extract washed to neutral, dried over anhydrous sodium sulfate and evaporated to dryness. The solid residue crystallized from acetone-hexane to give 17,20;20,21-bismethylenedioxy-$\Delta^4$-pregnen-3β-ol.

The foregoing compound was dehydrated with 50% acetic acid, according to the method described in Example I, to give 17,20;20,21-bismethylenedioxy-$\Delta^{3,5}$-pregnadiene.

A mixture of 1 g. of the foregoing bismethylenedioxy derivative and 20 cc. of 60% formic acid, was heated on a steam bath for 1 hour, the solution was cooled, water added and the formed precipitate filtered off. There was thus obtained $\Delta^{3,5}$-pregnadien-17α,21-diol-20-one.

*Example X*

A mixture of 1 g. of the foregoing compound, 4 cc. of pyridine and 2 cc. of acetic anhydride was left at room temperature overnight. It was then poured into water and the formed precipitate filtered off. There was thus obtained the 21-acetate of $\Delta^{3,5}$-pregnadien-17α,21-diol-20-one.

In the same manner, but using propionic, caproic and undecenoic anhydrides there were obtained the 21-propionate, 21-caproate and 21-undecenoate of $\Delta^{3,5}$-pregnadien-17α,21-diol-20-one.

*Example XI*

Example IX was repeated, but using as starting materials 16α-methyl-$\Delta^4$-pregnene-17α,21-diol-3,20-dione and 16β-methyl-$\Delta^4$-pregnene-17α,21-diol-3,20-dione, being obtained as final products, 16α-methyl - $\Delta^{3,5}$ - pregnadien-17α,21-diol-20-one and 16β-methyl-$\Delta^{3,5}$pregnadien-17α,21-diol-20-one.

By esterification of the above compounds with acetic anhydride in pyridine there were obtained the respective 21-acetates.

*Example XII*

A mixture of 1 g. of $\Delta^{3,5}$-pregnadien-17α-ol-20-one, 20 cc. of anhydrous benzene, 2 cc. of caproic anhydride and 500 mg. of p-toluenesulfonic acid was left at room temperature for 24 hours. After this period of time it was diluted with water and the mixture stirred during 30 minutes to hydrolyze the excess anhydride, the benzene layer was separated and washed to neutral, dried over anhydrous sodium sulfate and evaporated to dryness under vacuum. The residue crystallized from acetone-ether to give the caproate of $\Delta^{3,5}$-pregnadien-17α-ol-20-one.

In a similar way, the 21-acetate of $\Delta^{3,5}$-pregnadien-17α,21-diol-20-one was converted into the 17-caproate-21-acetate of $\Delta^{3,5}$-pregnadien-17α,21-diol-20-one.

*Example XIII*

Following the procedure described in Example IX, 10 g. of $\Delta^4$-pregnen-16α,17α,21-triol-3,20-dione were converted successively into 17,20;20,21-bismethylendioxy-$\Delta^4$-pregnen-16α-ol-3-one; 17,20;20,21-bismethylenedioxy-$\Delta^4$-pregnen - 3β,16α - diol; 17,20;20,21 - bismethylenedioxy-$\Delta^{3,5}$-pregnadien-16α-ol and $\Delta^{3,5}$-pregnadien-16α,17α,21- triol-20-one. To a suspension of 1 g. of the latter compound in 50 cc. of freshly distilled acetophenone were added 0.5 cc. of 72% perchloric acid and the mixture was stirred at room temperature for 1 hour. The resulting solution was washed with a sodium bicarbonate solution and with water to neutral, dried over anhydrous sodium sulfate and evaporated to dryness under vacuum. Crystallization of the residue from methanol afforded the 16α,17α-phenyl methyl-ketal of $\Delta^{3,5}$-pregnadien-16α,17α,21-triol-20-one.

Upon reaction of the foregoing compound with propionic anhydride in pyridine solution there was obtained the respective propionate.

*Example XIV*

A mixture of 3 g. of $\Delta^{3,5}$-pregnadien-17α,21-diol-20-one, 15 cc. of pyridine and 3 g. of tosyl chloride was kept overnight at 0° C. Water was added and the formed precipitate filtered off and dried to give the 21-tosylate of $\Delta^{3,5}$-pregnadien-17α,21-diol-20-one.

The crude product of the above reaction, was dissolved in 100 cc. of acetone, 4 g. of sodium iodide were added and the resulting mixture was refluxed for 1 hour, cooled, water added and the formed precipitate filtered off and washed to neutral. There was thus obtained 21-iodo-$\Delta^{3,5}$-pregnadien-17α-ol-20-one.

To 1 g. of the foregoing iodo ketone in 40 cc. of acetonitrile was added a suspension of 0.5 g. of silver fluoride in 2 cc. of water and 6 cc. of acetonitrile, and the mixture was stirred for 6 hours at 35–40° C. The insoluble part was filtered off and the filtrate evaporated to dryness under vacuum. There was added water to the residue, it was then extracted with methylene chloride, washed with water, dried and evaporated to dryness. The residue was chromatographed on 25 g. of silica. The fractions eluted with benzene-ether (80:20) were recrystallized from acetone-hexane to give 21-fluoro-$\Delta^{3,5}$-pregnadien-17α-ol-20-one.

*Example XV*

Following the method described in the foregoing example, 16α-methyl-$\Delta^{3,5}$-pregnadien-17α,21-diol-20 - one, 16β-methyl-$\Delta^{3,5}$-pregnadien-17α,21-diol-20 - one and the 16α,17α-phenyl methyl ketal of $\Delta^{3,5}$-pregnadien-16α,17α,21-triol-20-one were respectively converted into 21-fluoro-16α-methyl-$\Delta^{3,5}$-pregnadien-17α-ol-20-one, 21-fluoro-16β-methyl-$\Delta^{3,5}$pregnadien-17α-ol-20 - one and the 16α,17α-phenyl-methyl-ketal of 21-fluoro-$\Delta^{3,5}$-pregnadien-16α,17α-diol-20-one.

*Example XVI*

A mixture of 1 g. of $\Delta^{3,5}$-pregnadien-17α-ol-20-one, 40 cc. of acetic acid, 20 cc. of acetic anhydride and 500 mg. of p-toluenesulfonic acid, was left at room temperature for 1 hour. It was poured into water and stirred for 30 minutes to hydrolyze the excess anhydride, then extracted with methylene chloride and the organic extract was washed to neutral, dried over sodium sulfate and evaporated to dryness. By crystallization from acetone-hexane there as obtained the acetate of $\Delta^{3,5}$-pregnadien-17α-ol-20-one.

*Example XVII*

A cooled solution of 4 g. of $\Delta^{3,5}$-pregnadien-16α-ol-20-one, described in Example VIII in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the 21-iodo-$\Delta^{3,5}$-pregnadien-16α-ol-20 - one. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding the 21-acetoxy-$\Delta^{3,5}$-pregnadien-16α-ol-20-one. Upon further esterification with acetic anhydride by the method described in Example VIII there was obtained the 16,21-diacetate of $\Delta^{3,5}$-pregnadiene-16α,21-diol-20-one. Upon conventional saponification with dilute methanolic potassium carbonate, there was obtained $\Delta^{3,5}$-pregnadiene-16α,21-diol-20-one.

*Example XVIII*

By substituting in the foregoing example the $\Delta^{3,5}$-pregnadien-16α-ol-20-one by 16α-methyl-$\Delta^{3,5}$-pregnadien-20-one or 16β-methyl-$\Delta^{3,5}$-pregnadien-20-one described in Example IV, there were obtained the corresponding 21-iodo-16α-methyl-$\Delta^{3,5}$-pregnadien-20-one, 21 - iodo - 16β-methyl-$\Delta^{3,5}$-pregnadien-20-one, 21-acetoxy - 16α - methyl-$\Delta^{3,5}$-pregnadien-20-one and 21-acetoxy-16β-methyl - $\Delta^{3,5}$-pregnadien-20-one. Upon saponification of the latter two compounds as described in the previous example, there were finally obtained 16α-methyl-$\Delta^{3,5}$-pregnadien-21-ol-20-one and 16β-methyl-$\Delta^{3,5}$-pregnadien-21-ol-20-one.

We claim:
1. A compound of the following formula:

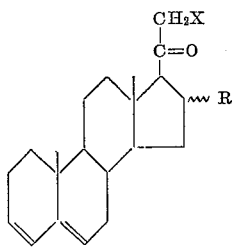

wherein X is selected from the group consisting of hydrogen, fluorine, hydroxy and hydrocarbon carboxylic acyloxy of less than 12 carbon atoms and R is selected from the group consisting of α-methyl, β-methyl, α-hydroxy and α-hydrocarbon carboxylic acyloxy of less than 12 carbon atoms.

2. 16α-methyl-$\Delta^{3,5}$-pregnadien-20-one.
3. 16β-methyl-$\Delta^{3,5}$-pregnadien-20-one.
4. 21-fluoro-$\Delta^{3,5}$-pregnadien-20-one.
5. 16α-methyl-21-fluoro-$\Delta^{3,5}$-pregnadien-20-one.
6. $\Delta^{3,5}$-pregnadien-16α-ol-20-one.
7. A compound of the following formula:

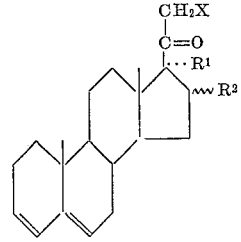

wherein X is selected from the group consisting of hydrogen, fluorine, hydroxy and hydrocarbon carboxylic acyloxy of less than 12 carbon atoms; $R^1$ is selected from the group consisting of hydroxy and hydrocarbon carboxylic acyloxy of less than 12 carbon atoms and $R^2$ is selected from the group consisting of hydrogen, α-methyl, β-methyl, α-hydroxy and α-hydrocarbon carboxylic acyloxy of less than 12 carbon atoms and $R^1$ and $R^2$ together represent the grouping.

wherein A is selected from the group consisting of hydrogen, lower alkyl, aryl and aralkyl containing up to 8 carbon atoms and B is selected from the group consisting of alkyl, aryl and aralkyl containing up to 8 carbon atoms.
8. $\Delta^{3,5}$-pregnadien-17$\alpha$-ol-20-one.
9. 16$\alpha$-methyl-$\Delta^{3,5}$-pregnadien-17$\alpha$-ol-20-one.
10. 16$\beta$-methyl-$\Delta^{3,5}$-pregnadien-17$\alpha$-ol-20-one.
11. $\Delta^{3,5}$-pregnadiene-17$\alpha$,21-diol-20-one.
12. $\Delta^{3,5}$-pregnadiene-16$\alpha$,17$\alpha$,21-triol-20-one.
13. 21-fluoro-$\Delta^{3,5}$-pregnadien-17$\alpha$-ol-20-one.
14. The acetate of $\Delta^{3,5}$-pregnadien-17$\alpha$-ol-20-one.
15. 16$\alpha$,17$\alpha$ - isopropylidendioxy - $\Delta^{3,5}$ - pregnadien-20-one.
16. The 16$\alpha$,17$\alpha$ - benzyl acetal of $\Delta^{3,5}$ - pregnadiene-16$\alpha$,17$\alpha$-diol-20-one.
17. The 16$\alpha$,17$\alpha$-phenyl methyl ketal of $\Delta^{3,5}$-pregnadiene-16$\alpha$,17$\alpha$,21-triol-20-one.
18. The 16$\alpha$,17$\alpha$-phenyl methyl ketal of 21-fluoro-$\Delta^{3,5}$-pregnadiene-16$\alpha$,17$\alpha$-diol-20-one.
19. The hydrocarbon carboxylic acid esters of less than 12 carbon atoms of $\Delta^{3,5}$-pregnadien-17$\alpha$-ol-20-one.
20. A process for the production of $\Delta^{3,5}$-pregnadiene derivatives which comprises treating the corresponding $\Delta^4$-pregnen-3-ol compounds with 50% aqueous acetic acid at a temperature between 75 and 100° C. for a period of between 1 to 4 hours.

References Cited in the file of this patent
UNITED STATES PATENTS
2,862,935    Marshall _____ Dec. 2, 1958